UNITED STATES PATENT OFFICE.

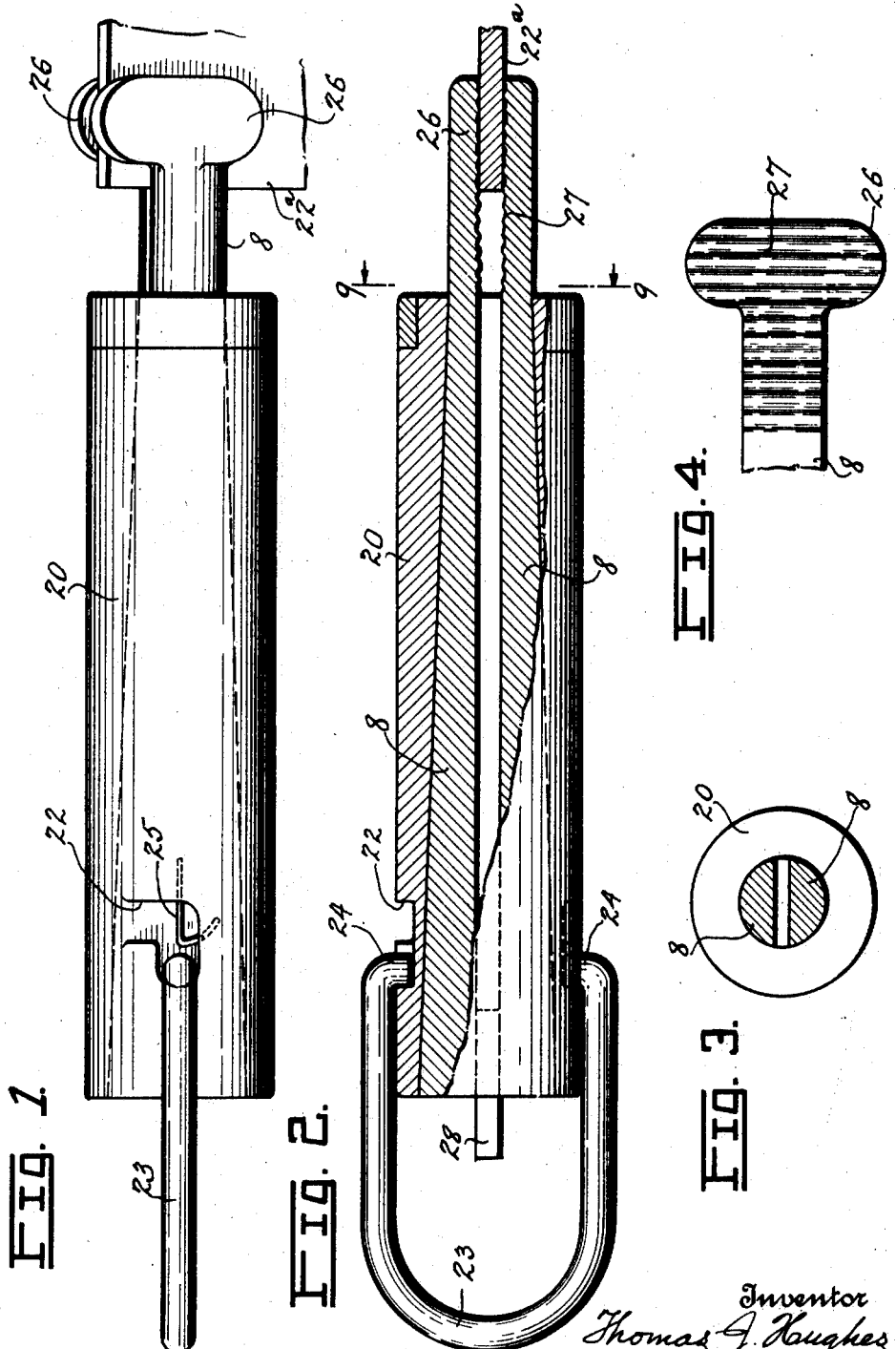

THOMAS JEFFERSON HUGHES, OF SEATTLE, WASHINGTON.

DEVICE FOR TIGHTENING CABLES.

1,388,716.   Specification of Letters Patent.   Patented Aug. 23, 1921.

Application filed April 12, 1920. Serial No. 373,440.

*To all whom it may concern:*

Be it known that I, THOMAS J. HUGHES, a citizen of the United States, residing at Seattle, county of King, and State of Washington, have invented a new and useful Device for Tightening Cables; and I do hereby declare that the following is a full, clear, and exact specification, such as will enable others skilled in the art to which it appertains to make and use the same.

The invention is a device for gripping objects such as cables, pipes, or the like, the same being useful, more particularly, in connection with cables for the purpose of placing tension thereon in order to tighten said cables.

One object of the invention is to frictionally grip the cable, or other article, so securely as to preclude the possibility of slippage between said article and the gripping mechanism; in other words, the gripping engagement is of such character that an increase in the pull on the gripper operates to secure an increase in the frictional engagement of the device with the cable, or other article.

A further object is to enable the device to be applied easily and quickly to the cable, or other article, and to be shifted or adjusted to a desired position relatively to such article.

With these ends in view, the invention embodies a plurality of gripping members the gripping faces of which are segmental and the exterior surfaces of which are tapering in the direction of the length of said members, combined with incasing means for retaining said gripping members in operative relation to each other.

Means are provided for applying strain to the incasing means for imparting movement to said incasing means relatively to the gripping members, such strain applying means being usually in the form of a clevis whereby the incasing means operates to close the gripping members into frictional contact with the cable for positively locking the parts in operative relation.

Other features and advantages of the invention will appear from the following description taken in connection with the drawings, wherein—

Figure 1 is an elevation of a practical form of gripping means embodying my invention.

Fig. 2 is a view partly in longitudinal section and partly in plan.

Fig. 3 is an end view of the incasing means with the gripping members in cross section, and Fig. 4 is a plan view of a part of one gripping member illustrating an exposed jaw.

In the drawings I have shown my gripper in connection with a cable for placing tension thereon in a manner to tighten said cable, but it is to be understood that the gripper is not restricted to this particular use, for the reason that said gripper may be used in connection with pipes or other objects for the performance of useful work in connection therewith.

20 designates incasing means for a plurality of gripping members, 8, said incasing means being illustrated in the form of a sleeve, the length of which is suitable for the work in hand. The gripping members extend lengthwise within the incasing sleeve, and in a practical form, said sleeve and the gripping members are fashioned for mutual coöperation to the end that strain applied to the sleeve operates to compress or close said gripping members into tight frictional contact with the cable, or the like.

The gripping members are essentially wedge shaped in longitudinal section, each member being composed of a piece of longitudinally tapering metal which in cross section is a segment. Each member is provided with a gripping surface, but exteriorly each member has a surface which resembles a section of a cone, the same being segmental in cross section and tapering lengthwise. It is preferred to make the gripping members of case hardened steel, whereas the outer surfaces of said members being each one half of a cone, the sides of said members being parallel to the sides of the conical surfaces in the inner circle of the incasing sleeve 20.

A suitable number of gripping members 8 are positioned within the sleeve 20, two being shown. For conveniently applying the gripper to a cable, or other object the sleeve is composed of separable members, each member comprising a piece of metal wedge shaped in longitudinal section and of segmental cross section. The taper of the incasing sleeve 20 is reversed to the taper of the gripping members, and thus a strain or pull applied to the sleeve results in such relative movement between the sleeve and the gripping members as to apply compressive force to said gripping members whereby the device is positively gripped upon the cable.

The gripping members, 8, are in effect a tapering sleeve cut in two pieces making half round members which may be provided with T-shaped jaws, 26, on the smaller end of the cone, see Figs. 1 and 4, for gripping a plate or other flat object, the work to be gripped being indicated at 22$^a$ in Figs. 1 and 2 of the drawings.

For hooking the clevis into the incasing sleeve, it is preferred to provide angular slots or recesses 22 in the incasing sleeve 20, and bend the ends of the clevis, 23, to fit into said slots 22, so as to detachably connect the clevis to the sleeve, see Figs. 1 and 2.

As will be noted by reference to Figs. 1, 2, and 3, the incasing sleeve, 20, is a solid unbroken tubular member, open at the respective ends. This sleeve is provided near one end and in the opposite sides thereof with L-shaped or bayonet shaped recesses or slots 22, one end portion of each recess or slot being closed to produce a shoulder whereas the other end portion is open. The clevis 23 is an open loop, the ends 24 of which are bent inwardly, see Fig. 2, whereby the bent ends may be slipped through the open ends of the recesses and moved therein until they abut the shoulders, thus making provision for the easy and quick attachment or disengagement of the clevis with reference to the incasing sleeve. The clevis is precluded from becoming detached accidentally by the use of a spring detent, 25, positioned at the angle or bend of the L-shaped recess, see Fig. 1, which detent can be easily pressed out of position when it is desired to attach or detach the clevis.

The gripping members, 8, are incased by the sleeve, one end portion of said members, 8, protruding beyond the sleeve, see Figs. 1 and 2. Said protruding end portions act as jaws 26 in gripping a plate, or any other object desired, indicated at 22$^a$. The protruding ends of the jaws may be enlarged as at 26, and the faces of said jaws may be smooth and plain, or said faces may be roughened, as at 27, Figs. 2 and 4. As shown in Fig. 3, the opposing faces of the members 8 may be flat, and the two members assembled for the flat faces to lie in parallel relation, see Fig. 2; but it is to be understood that the inner faces may be semi-circular, or the inner faces of the two members may be of any other form desired so as to result in an opening which in cross section is triangular, rectangular, or any other shape. When the members 8 are used for gripping an external object, as 22$^a$, then it is preferred to use a filler member 28 inserted between the members at the ends opposite to the jaws, see Fig. 2, thus imparting the required purchase to the jaw ends of the members 8, all as will be readily understood.

Having thus fully described the invention, what I claim as new and desire to secure by Letters Patent is:—

1. In a gripping device, a tubular incasing member provided with offset recesses in opposite sides thereof, combined with a clevis the end portions of which are received in the offsets of said recess whereby the clevis is detachably connected with the incasing member, and gripping members incased within said tubular member.

2. In a gripping device, a tubular incasing member provided with offset recesses in opposite sides thereof, and a clevis the end portions of which are provided with inwardly extending lugs adapted to be positioned in the offsets of said recesses, combined with a retainer in the path of one lug of said clevis for precluding accidental separation of the clevis from the tublar member, and gripping members incased within the tubular member.

3. In a gripping device, the combination of a tubular incasing member the internal surface of which is tapering and constitutes an internal wedge, a plurality of gripping members extending within said tubular member, said gripping members being provided with jaws unitary therewith and the width of which jaws exceeds the diameter of the internal wedge, which jaws are exposed at one end of the tubular member, and a clevis connected with the tubular member at the end portion thereof opposite to said exposed jaws of the gripping members.

4. In a gripping device, a tubular incasing member the internal surface of which is tapering and constitutes an internal wedge, a plurality of gripping members positioned for frictional contact with said internal wedge surface of the incasing member, said gripping members being exposed at one end beyond the incasing member and said exposed portions constituting gripping jaws unitary with said gripping members, and a strain-applying member connected with said incasing member.

5. In a gripping device, an incasing member provided in its outer surface with recesses, a clevis provided with means adapted to said recesses whereby the clevis is detachable and attachable at will, and gripping members coöperating with said incasing member.

THOMAS JEFFERSON HUGHES.